(12) United States Patent
Gandolfi et al.

(10) Patent No.: US 8,813,045 B2
(45) Date of Patent: Aug. 19, 2014

(54) OBJECT LEVEL COMPATIBILITY AND CLASS RESIZING UTILIZING SEMANTIC VALUES

(75) Inventors: Federico Adrian Gandolfi, Markham (CA); Robert Maximillian Nathan Klarer, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/496,040

(22) PCT Filed: Sep. 22, 2010

(86) PCT No.: PCT/CA2010/001504
§ 371 (c)(1),
(2), (4) Date: Mar. 14, 2012

(87) PCT Pub. No.: WO2011/035431
PCT Pub. Date: Mar. 31, 2011

(65) Prior Publication Data
US 2012/0174080 A1    Jul. 5, 2012

(30) Foreign Application Priority Data

Sep. 25, 2009 (CA) ..................................... 2678095

(51) Int. Cl.
*G06F 9/45* (2006.01)
(52) U.S. Cl.
USPC .......................................................... 717/137
(58) Field of Classification Search
None
See application file for complete search history.

(56) References Cited

U.S. PATENT DOCUMENTS

| 5,339,438 | A | 8/1994 | Conner et al. |
| 5,613,120 | A | 3/1997 | Palay et al. |
| 6,658,421 | B1 * | 12/2003 | Seshadri ....................... 717/140 |
| 6,978,450 | B2 * | 12/2005 | Burch ........................... 717/145 |
| 7,665,075 | B1 * | 2/2010 | Daynes et al. ................. 717/148 |
| 2007/0006137 | A1 * | 1/2007 | Savagaonkar et al. ........ 717/106 |
| 2007/0038988 | A1 * | 2/2007 | Das ............................... 717/157 |
| 2007/0234289 | A1 * | 10/2007 | Naroff et al. .................. 717/120 |

FOREIGN PATENT DOCUMENTS

| CN | 1949175 A | 4/2007 |
| JP | 2002-108625 A | 4/2002 |
| JP | 2002-215451 A | 8/2002 |

OTHER PUBLICATIONS

Forman, Ira R., Release-to-Release Binary Compatibility in SOM, ACM SIGPLAN Notices, vol. 30, issue, 10, pp. 426-438, Oct. 17, 1995.
Canadian Intellectual Property Office, PCT International Search Report for International Application No. PCT/CA2010/001504, dated Dec. 13, 2010.
Canadian Intellectual Property Office, PCT Written Opinion of the International Search Authority for International Application No. PCT/CA2010/001504, dated Dec. 21, 2010.
Canadian Intellectual Property Office, Canadian Office Action for Canadian Application No. 2,678,095, dated Dec. 23, 2010.

* cited by examiner

*Primary Examiner* — Philip Wang
(74) *Attorney, Agent, or Firm* — Moore & Van Allen PLLC

(57) ABSTRACT

A method of converting software code to an object on a computing device may include receiving the software code at the computing device and translating at the computing device the software code to an object file. Translating the software to the object file may include determining that the software code includes an item of interest that requires a value being coded into the object. The method may also include creating a variable to represent the coded value and storing the variable, which is linked to the coded value, in a table of variables associated with the object file.

28 Claims, 4 Drawing Sheets

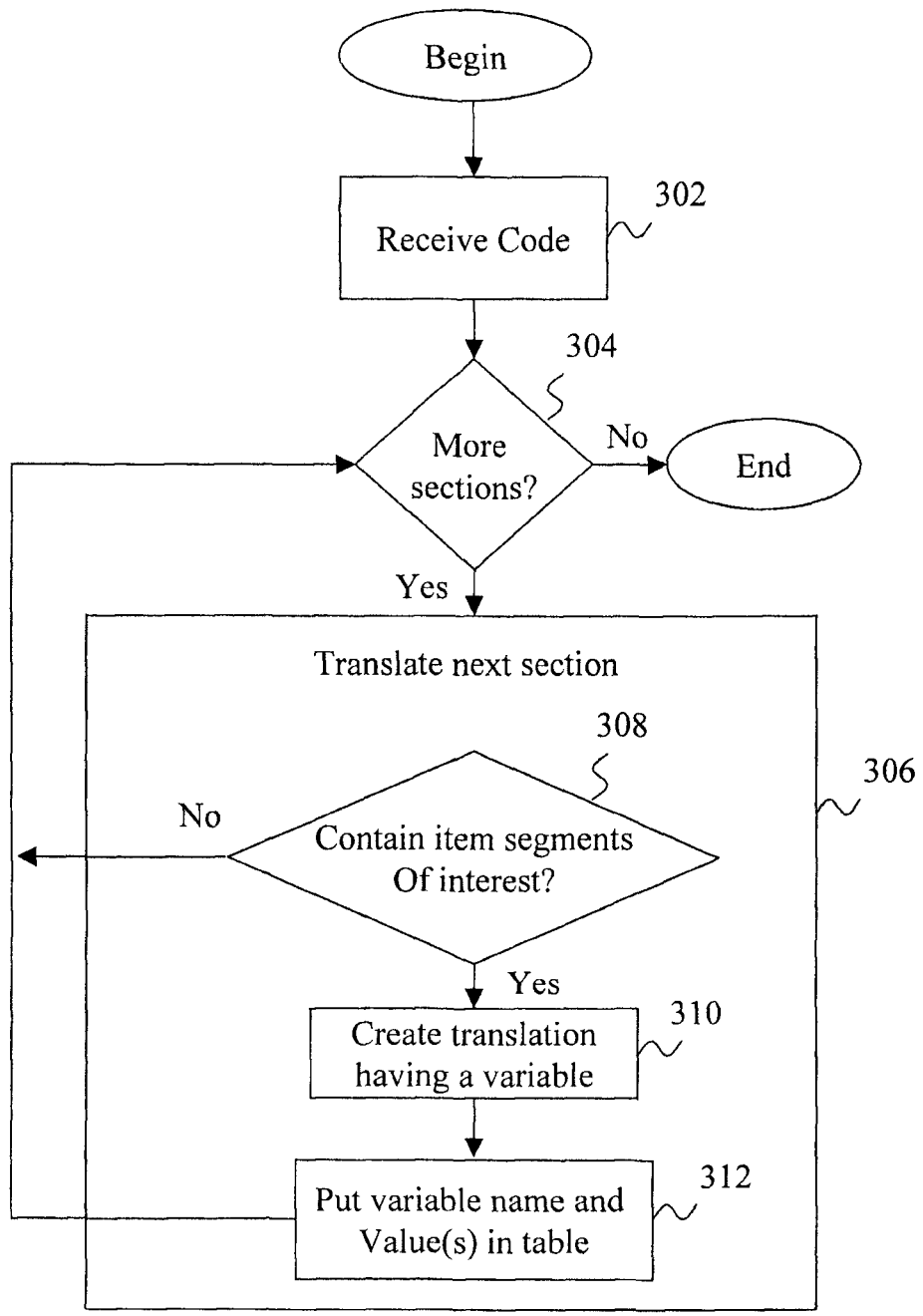

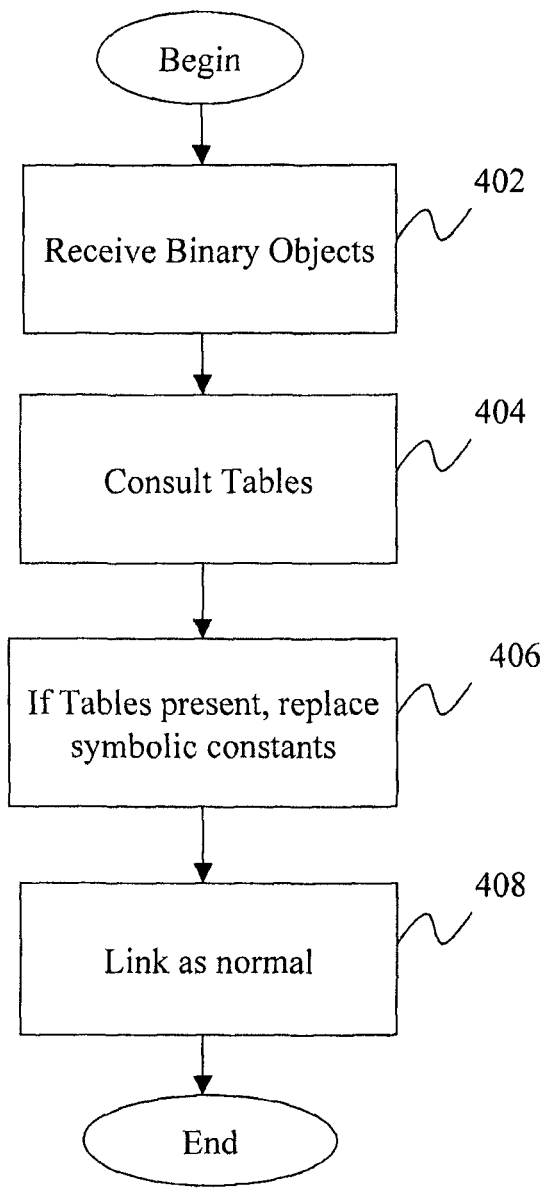

OBJECT LEVEL COMPATIBILITY AND CLASS RESIZING UTILIZING SEMANTIC VALUES

CROSS-REFERENCE TO RELATED APPLICATIONS

This application is filed under the provisions of 35 U.S.C. §371 and claims the benefit of International Patent Application No. PCT/CA2010/001504, filed on Sep. 22, 2010, entitled "Object Level Compatibility and Class Resizing Utilizing Semantic Values" in the name of Federico Adrian Gandolfi, et al., which claims priority of Canadian Patent Application No. 2,678,095, filed on Sep. 25, 2009, both of which are hereby incorporated by reference herein in their entirety.

BACKGROUND

The present invention relates to creating executable programs for a computer system, and more specifically, to translating software code by employing semantic values.

Computer programs are typically composed of one or more components called binary objects. Each binary object represents a portion of the executable code, or module, that constitutes the program of which it is a component. The binary objects are typically created by a compiler (also called a translator) that converts software code written in a higher level language into the binary object.

The binary objects are then linked together to compose a complete executable program. The software tool that performs this task is called a linker.

Before a program can be run, it must be loaded into a computer's memory. The component of the operating system that performs this task is called the program loader. For a variety of reasons, some components of the program might not be linked to the program by the linker. Instead, these components are added to the executable by the loader. Such components are typically called shared objects, shared libraries, or dynamically loaded libraries.

One of the benefits of partitioning a program into a multitude of binary objects is modularity. It is possible that the source code corresponding to one binary object can be altered without necessitating changes to every other binary object. In particular, only the binary object whose source code has been altered needs to be translated again, using a compiler. Unaffected modules, including shared libraries, need not be retranslated.

The linker/loader technology that is used pervasively in contemporary operating systems, including but not limited to AIX, Linux, Windows, and Z/OS was devised before the advent of popular Object Oriented programming languages. As such, these languages introduce new complexities that are not well served by the sort of modularity that is available today. Specifically, some activities that commonly arise in the day-to-day work of the Object Oriented programmer require that an entire program be retranslated, not just the binary objects that are directly affected. These activities may include but are not limited to: adding virtual functions to a class interface; removing virtual functions from a class interface; factoring virtual functions into the interface of a base class; adding data members to a class interface; and adding a new base class to an existing class.

The inability to perform these activities without recompiling all of a program's constituent binary objects, including its shared libraries, is an enormous limitation. A single shared library may be used by many separate application programs. As a result should any of these changes be made within a shared library every application program of which the shared library is a component must also be retranslated (recompiled). This is often impossible because the user of the application is not a skilled programmer, does not possess the appropriate software tools, or does not have access to the program source code. Further, the user may have no control over modules to link to in the future, or from past development. As a result, authors of shared libraries are severely constrained with respect to the kinds of changes they can make to their software. In some cases, these constraints make it impossible to fix even simple bugs. This is known in the literature as the Release-to-Release Binary Compatibility (RRBC) Problem.

SUMMARY

According to one embodiment of the present invention, a method of converting software code written in a high level language to a binary object on a computing device is disclosed. This embodiment includes receiving the software code written in the high level language at the computing device; and translating at the computing device the software code to a binary object file. Translating includes determining that the software code includes an item of interest that requires a value to be hard coded into the binary object and that the class is resizable. Translating in this embodiment also includes creating a semantic variable to represent the hard coded value and storing the semantic variable and the hard coded value in a table in the binary object.

Another embodiment of the present invention is directed to a method for creating an executable program from a plurality of binary objects. The method of this embodiment includes receiving a first plurality of binary objects at a computing device, at least one containing a table of semantic variables that represent hard coded values for at least one value requiring a hard coded value and linking the first plurality of binary objects together and replacing semantic variables in at least one binary object with the hard coded values in the at least one table. The method also includes loading the first plurality of binary objects into the computing device for operation in combination with one or more additional binary objects.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 shows a method of translating according to an embodiment of the present invention; and FIG. 4 shows a method of linking binary objects according to an embodiment of the present invention.

DETAILED DESCRIPTION

Embodiments of the present invention are directed to a compiler-linker-loader system where certain values typically written into binary objects by the compiler are instead replaced with a variable and the value written in by either the linker or the loader at a later time. Such a system may be especially useful for use with programs written in high level programming languages such as C or C++. Of course the invention is not limited to use with only programs written in C or C++ and could be used with programs written in other languages.

A conventional C++ implementation computes the following items during execution of the translator (i.e. at compile-time): the size of any class types; the offset, within a class of any data member; and the offset within a class' virtual table (vtable or equivalent) of any virtual function pointer. These values are written by the translator into the object file. In the present invention, the translator instead creates a table containing variables that are linked to the values. The variable, rather than the value, is written in the object and the variable is used by the linker or loader to access the table to replace the value. Accordingly, only the object files that change the definitions of the above items need to be recompiled, rather than all parts of the program.

Figure 1:
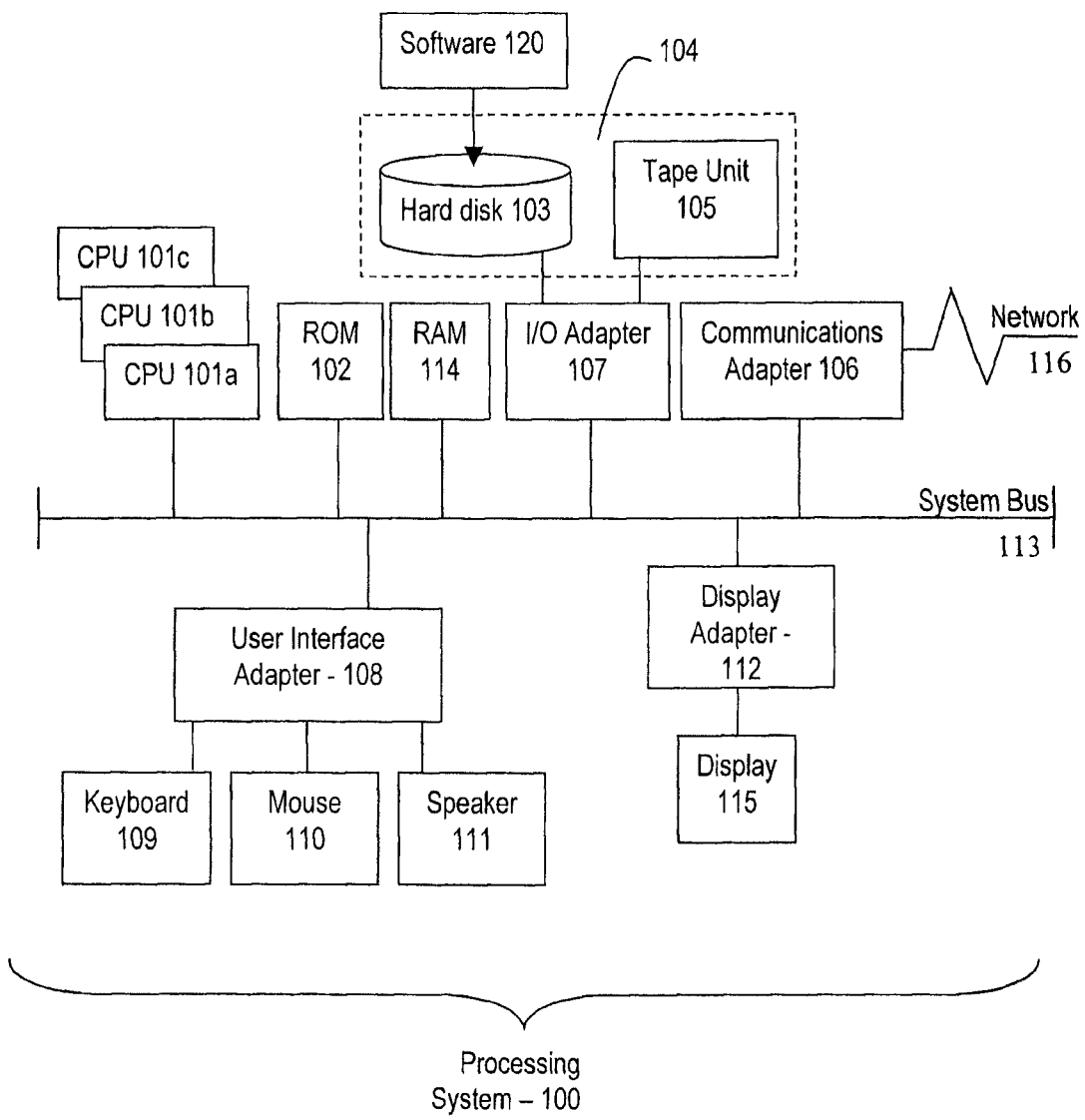
FIG. 1 is system diagram for a computing device according to an embodiment of the present invention.

FIG. 1 shows an example of a computing system on which embodiments of the present invention may be implemented. It should be understood that the system may be distributed and portions of the system described below may exist in different physical locations from one another.

In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM® Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Examples of operating systems that may be supported by the system 100 include Windows® 95, Windows® 98, Windows NT® 4.0, Windows XP®, Windows® 2000, Windows® CE, Windows Vista®, Mac OS, Java®, AIX®, LINUX, and UNIX®, or any other suitable operating system. The system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
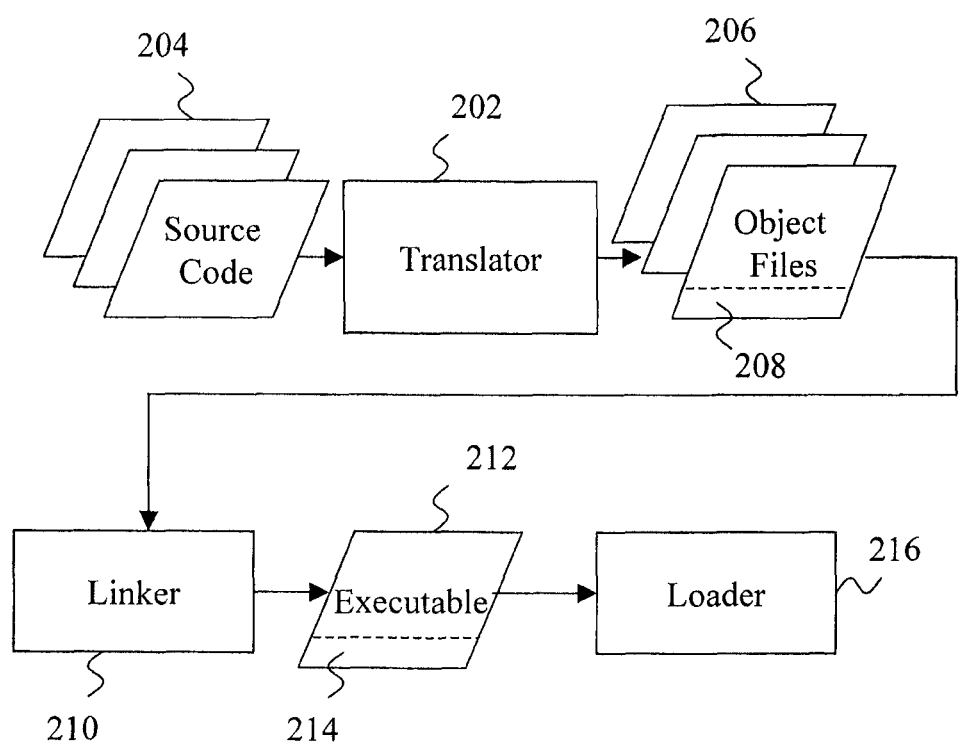
FIG. 2 is data-flow diagram showing an example of the processing performed by an embodiment of the present invention.

FIG. 2 is a data-flow diagram showing data movement in a system according to one embodiment. The system includes a translator 202. The translator 202 may be based on any know compiler. The translator 202 receives one or more source code files 104 and converts each source code file into an object file 206. Of course, the exact number of source code files may vary and may include, for example, a shared library or other source code file used by many applications.

The translator 202, however, may differ from typical translator in how it creates an object file from source code. In particular, the translator 202 may create a table 208 in each object file containing variables that are linked to particular values that were typically hard coded into the object file by conventional compilers. The variable, rather than the value, is written in the object and the variable is used by the linker 210 or loader 212 to access the table at which time the variable is replaced with the value.

The system also includes a linker 210. The linker 210 may be similar to a conventional linker. A linker or link editor is a program that takes one or more objects 206 generated by the compiler 202 and combines them into a single executable program 212. However, the linker 210 according to one embodiment of the present invention may be configured such that it consults the table 208 of each object file 206 to fill in variables with static values typically written to the object files 206 by a prior art compiler. These values are hard coded in the executable. A hard coded value is a value that does not change. An example of hard coded value is when a variable is assigned to specific integer. Of course, not all values that were contained in the tables may be converted into a hard value and the executable may include an executable variable table 214.

The system may also include a loader 216. A loader is the part of an operating system that is responsible for loading programs from executables (i.e., executable files) into memory, preparing them for execution and then executing them. In the prior art, a loader is usually a part of the operating system's kernel and usually loaded at system boot time and stays in memory until the system is rebooted, shut down, or powered off. Some operating systems that have a pageable kernel may have the loader in the pageable part of memory and thus the loader sometimes may be swapped out of memory. All operating systems that support program loading have loaders.

The loader 216 according to an embodiment of the present invention operates similar to a prior art loader. The loader 216, however, also consults the executable variable table 214 of each executable 212 to fill in variable with a hard values typically written to the object files 206 by a prior art compiler.

FIG. 3 shows a method of operation of the translator 202 (FIG. 2) according to one embodiment of the present invention. At a block 302 a portion or all of the portions to be translated are received at a translator. A translator (or compiler) is a computer program (or set of programs) that transforms source code written in a computer language (the source language) into another computer language (the target language, often having a binary form known as object code). The most common reason for wanting to transform source code is to create an executable program.

At a block 304 it is determined if there are more sections (either an entire source code file or a section thereof) to be translated. If not, the method ends and translation is complete.

If there is more translation to be done, the next section or file is translated at a block 306. As part of block 306 (translation) at a block 308 it is determined if the segment contains an item of interest. An "item of interest" as the term is used herein shall refer to a code segment that a prior art translator may have created a static value for during translation. Examples of items of interest may include, but are not limited to, sizes of class types, offsets used to access non-static data members within class objects, and virtual function table offsets. It will be understood that a conventional C++ implementation computes the following items during execution of the translator (i.e. at compile-time): the size of any class types; the offset, within a class, of any data member; and the offset within a class' vtable (virtual table or equivalent) of any virtual function pointer. These computed values are the "static" or hard coded values described above that previously were are written by the translator into the object file.

By way of explanation, the C++ programming language allows programmers to define program-specific datatypes through the use of classes. Instances of these datatypes are known as objects and can contain member variables, constants, member functions, and overloaded operators defined by the programmer. Syntactically, classes are extensions of the C struct, which cannot contain functions or overloaded operators. The following description will describe examples for the C++ language but it shall be understood that other languages are contemplated and are within the scope of the present invention.

At a block 310 a translation having a variable name is created. This is different than the prior art as shown by the non-limiting following examples.

The value of a "sizeof" expression is computed by the C++ language translator at compile time. The sizeof operator yields the size of its operand with respect to the size of type char. A conventional C++ implementation replaces a sizeof expression with a constant value that is equivalent to the size of its operand, counted in octets. For example, the statement:

```
struct S {
int datum;
};
const size_t char_size = sizeof(S);
``` would have been translated into the following:

```
const size_t char_size=4;
``` where the value "4" will be hard-coded into the binary object.

Embodiments of the present invention may differ from conventional implementations in that, when the operand to the sizeof operator is a class type or has a class type, the transformed expression replaces the sizeof expression with a symbolic constant, rather than an ordinal value. For example, the translator of the present invention may translate the above statement into:

```
const size_t char_size=SYMBOL_sizeof_S.
```

At a block 312, the hard value for_SYMBOL_sizeof_S (4 in this example) is stored in a table. This table is then used by the linker or loader to later insert the value 4 for the expression_SYMBOL_sizeof_S. This allows for changes to be made in one section without having to recompile the entire program, only the section having changes made (e.g., the object file that was changed) to be recompiled. This alleviates some or all of the problems described above.

The following section describes other changes to the compiler that may be made and how those may be understood. For example, when dynamically allocating memory (e.g., a "new" expression) in the prior art a statement such as:

```
struct S {
int datum;
};
S * sptr = new S;
``` may have been transformed into the statement:

```
struct S {
int datum;
};
S * sptr = ::operator new(4);
```

As above, the value "4" will be hard-coded into the binary object, and represents the amount of storage requested from the memory allocator. This value is passed as an argument to the function ::operator new, which invokes the memory allocator. Embodiments of the present invention may differ from this conventional implementation in that, when the operand to the new expression is a class type, the transformed new expression passes a symbolic constant, rather than an ordinal value as an argument to ::operator new, For example, the above statement may be transformed according to an embodiment of the present invention to:

```
struct S {
int datum;
};
S * sptr = ::operator new(_SYMBOL_sizeof_S);
```

As another example, allocation of automatically-scoped objects may differ in the present invention. In the prior art, automatically-scoped objects, including value function parameters, are allocated on the program stack. The amount of storage reserved on the stack for a given class object is hard-coded into the binary object. Embodiments of the present invention may differ from conventional implementations in that, when the object to be allocated has class type, the amount of storage reserved is determined by a symbolic constant, rather than an ordinal value in the same manner as described above.

As yet another example, consider the case of the allocation of statically-scoped objects. Typically, class objects with static allocation are stored in memory that is set aside for them when the program is loaded. The amount of storage to be reserved for this purpose is specified in a section of the binary object file that exists for this purpose. For example, in the Common Object File Format (COFF), the amount of storage to be reserved for each static class object is specified in a .bss section of the object file. In embodiments of the present invention, the translator encodes the .bss section (or equivalent) of the object file according to conventional practice, except that each entry in the .bss section (or equivalent) will contain additional information that indicates the type of the class object whose static allocation is being represented. This additional information may be used by the program loader.

As another example, consider the case of sub-object offsets in the presence of multiple inheritance. In the presence of multiple inheritance, it is necessary to adjust the "this" pointer with an offset when converting the type of a class object from the most derived type to a base type, or between base types. For example, consider the following expression:

```
struct Left {
int datum1;
};
struct Right {
int datum2;
};
struct Derived: Left, Right {
int datum3;
};
void fn(Right * arg);
int main( ) {
Derived dobj;
fn(&dobj);
}
```

The class object dobj in this example contains a subobject of type Left and another subobject of type Right. A conventional C++ compiler will locate the subobject of type Left at offset 0 within dobj. The subobject of type Right will be located at an offset within dobj that is calculated as follows: Let_SYMBOL_sizeof_Left be a symbolic constant that represents the size of class type Left. Let DerivedMembers be some symbolic constant that represents the aggregate size of all of the non-static data members of class type Derived, excluding those members inherited from its base classes. DerivedMembers also includes the size of any alignment padding that is required. The offset of the subobject of type Right within dobj is the sum of _SYMBOL_sizeof_Left and DerivedMembers. In conventional C++ translators, this offset is calculated as needed and is encoded directly in the object file. For example, in the call to the function named fn( ), the type of the expression &dobj must be converted from type Derived * to type Right *. To accomplish this, the pointer represented by the expression &dobj must be adjusted so that it represents not the address of the object dobj, but of the subobject of type Right that dobj contains. This adjustment is achieved by adding to the address of dobj the offset of the Right subobject with dobj. Assuming that the sizeof an int is 4, and the alignment of an int is 4, the offset of Right within dobj is 8. Thus, a conventional C++ compiler will transform function main( ), above, into the following form:

```
int main( ) {
Derived dobj;
fn(static_cast<Right *>(&dobj + 8));
}
```

The offset is expressed as a numerical value directly in the generated code. In the present invention, such offsets are not represented as ordinal values, but as symbolic constants:

```
int main( ) {
Derived dobj;
fn(static_cast<Right *> (&dobj +
   _SYMBOL_offsetof_Right_within_Derived));
}
```

These same offsets are used in when a virtual function is invoked. However, since the value of the offset depends on the dynamic type of the object used to dispatch the virtual function, the offset cannot be encoded in the function call site because the dynamic type of the object cannot be known until the program is executed. For this reason, the offset is encoded as a "this adjustment" in the vtable. There are two common techniques for accomplishing this: (1) each entry in the vtable is a pair consisting of a pointer to the virtual function and the appropriate offset, or (2) the vtable consists only of a pointer to executable code; and the code referenced by this pointer may either be the virtual function or an "adjustor thunk" in cases where the offset is nonzero—the adjustor thunk adds the correct offset to the calling object's this pointer and then branches to the virtual function. In either case, conventional C++ translators represent the offset using a numeric value. In the present invention the offset is represented using a symbolic constant, as above.

Another example may be related to dynamic cast tables. C++ implementations generate dynamic cast tables to allow the inter-conversion of class types to be computed during program execution. Dynamic cast tables contain subobject offsets, similar to those described. In the present invention, these offsets are represented using symbolic constants, as above.

In addition to class sizes, conventional C++ implementations hard-code the offsets that are used to access non-static data members within class objects. In the present invention, the offset is represented using a symbolic constant. This technique is applied both to direct member access and to pointers to non-static data members.

In addition, embodiments of the present invention may apply the techniques above to the case of virtual function table offsets. Individual entries in a class' vtable are accessed by means of offsets into the vtable. Conventional C++ implementations hard-code these offsets into function call sites. For example,

```
struct Base {
    virtual void foo( ) const { }
    virtual void bar( ) const { }
};
struct Derived : Base {
    virtual void bar( ) const { }
};
int main( ) {
    const Base & ref = Derived( );
    ref.bar( );
}
```

If each vtable entry occupies 4 bytes and the pointer to the vtable is located at offset 0 from the start of an object of class type Base or Derived, then the call to function bar( ) in main( ) will be transformed as follows:

(\*\*((void(\*\*)( )const)(ref→0+4)))(ref).

The subexpression ref→0 represents the address of start of the vtable, and the numeral 4 is the offset within the vtable of the entry representing the virtual member function bar( ). In the present invention, this numeral is replaced by a symbolic constant.

A class' vtable may also contain Virtual Base Pointers (VBPs). These are equivalent to the offsets of base class subobjects inside containing class objects, and are handled as described above.

The above description details examples of replacements that may be made at block 310. It shall be understood that the values and the symbolic constants that are used to represent them are stored in a table in the object file at a block 312.

Each of the symbolic constants identified above may be defined in one of four tables that are located in an optional header or footer section of the object file format that has been created at block 312. The program linker and loader may be extended according to the present invention to allow them to read this section. In one embodiment, the four tables may include: 1) a table of class types sizes that devotes a single row to each class type. In this table a given row contains three items of information: the name of the symbolic constant that represents the class type's size, the size of the class type as determined by the language translator using the usual method, and a flag that indicates whether the class type can be resized by the linker/loader; 2) a table of subobject offsets within containing classes, as described above. A given row contains two items of information: the name of the symbolic constant, and the value of the offset; 3) A table of non-static data member offsets where a given row contains two items of information: the name of the symbolic constant and the value and the value of the offset; and 4) a table of vtable offsets.

In one embodiment, if the target executable links to no dynamic or shared libraries, all of the symbolic constants described above may be resolved by the linker. Each symbolic constant that appears in the executable code is replaced by the corresponding value, as determined by the appropriate table. Since the header or footer section that contains these tables is optional, a linker that embodies this invention can consume binary objects that contain these files as well as binary objects that do not. For this reason, an existing C++ compiler can be extended to embody this invention, and binary objects that were created by an earlier version of the compiler can be linked to binary objects that were created by a new version of the compiler that generates the tables.

FIG. 4 shows a flow chart of how a linker or loader may operate according to an embodiment of the present invention. At a block 402 the binary objects created by the translator are received at a linker. The receipt may be from a compiler in the same or different location than the linker. The linker examines the object files to determine if they contain any tables according to the present invention at a block 404. In the event that tables are present, at a block 406 symbolic constants are replaced with static values by the linker. This process is described in greater detail below. At a block 408, the linker continues to link objects as in the prior art.

As discussed above, at a block 406 symbolic constants are replaced. Normally, a class type is defined in every program module that uses it. If a class type is modified in some way, then every binary object corresponding to a program module that defines the class type must be recompiled. In a conventional C++ translator/linker environment, a failure to retranslate every module that contains a class definition after that class has been modified in some way will result in a linktime error or program malfunction during execution. A linker according to an embodiment of the present invention may address this problem. Consider a class definition is modified in such a way that its size is changed, or the position of any non-static data member or base class subobject within it is altered. The tables described above contain sufficient information to allow a linker to detect discrepancies between binary objects with respect to the definition of a given class type. Reconciliation of these discrepancies can be performed in any of the following ways: 1) time and date stamp: use the information from the binary object that was most recently created; 2) class versioning: allow the programmer to associate version numbers with her classes by means of a pragma directive and use the information associated with the most recent version of the class; 3) programmer interaction: allow the programmer to directly specify, when invoking the linker, how discrepancies are to be resolved; 4) cause the version of the class definition that results in the creation of the largest class; and 5) cause the information from the binary object that contains the vtable corresponding to the class that is the source of the discrepancy.

It should be noted that the loader may operate in the same manner as described above for the linker in the event that the one or more shared libraries are utilized.

Of course, as one of ordinary skill in the art will realize, embodiments of the present inventions may experience difficulties in some discrete situations. These may include, for example, adding and removing items from polymorphic classes, function in-lining and dealing with templates. As such, these types of classes may be marked as non-resizable and the compiler operates on them as in the prior art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of converting software code to an object on a computing device, comprising:
    receiving the software code at the computing device; and
    translating at the computing device the software code to the object, the translating comprising:
    determining that the software code includes an item of interest that requires a value being coded into the object;
    creating a variable to represent the value in the object, wherein the variable is written in the object rather than the value; and
    storing the value represented by the variable in a table associated with the object.

2. The method of claim 1, wherein the software code is written in a high level language.

3. The method of claim 1, wherein the item of interest comprises one of a size of class type, an offset to access a non-static data member and a virtual function table offset.

4. The method of claim 1, wherein the table comprises a table of vtable offsets.

5. The method of claim 1, wherein the table comprises a table of class types sizes.

6. The method of claim 1, wherein the table comprises a table of subobject offsets within containing classes.

7. The method of claim 1, wherein the table comprises a table of non-static data member offsets.

8. The method of claim 1, further comprising storing the table in a header portion of the object.

9. The method of claim 8, further including:
    receiving a plurality of objects at a linker on the computing device;
    linking the plurality of objects to one another; and
    resolving any discrepancies between the objects.

10. The method of claim 9, wherein resolving any discrepancies between the objects comprises resolving discrepancies between the table in each object utilizing the table contained in a most recently created object.

11. The method of claim 9, wherein each object comprises at least one table.

12. The method of claim 9, wherein at least one object does not include a table.

13. The method of claim 1, wherein the object includes the table storing the value.

14. The method of claim 1, wherein storing the value comprises storing the value and a symbolic constant representing the value in the table and the table is contained in the object, the symbolic constant is defined by a group of tables comprising a table of class types sizes; a table of subobject offsets; a table of non-static data member offsets; and a table of vtable offsets.

15. The method of claim 14, wherein group of tables are located in one of a header section and a footer section of the object.

16. A method for creating an executable program from a plurality of objects, the method comprising:
    receiving a plurality of objects at a computing device, at least one of the objects comprising a generated variable representing a value in the at least one of the objects, the generated variable being written in the at least one of the objects rather than the value, the variable being linked to the value and a table, the value being stored in the table;
    linking the plurality of objects together and replacing the variable in the at least one of the objects with the value; and
    loading the plurality of objects into the computing device for operation in combination with one or more additional objects.

17. The method of claim 16, wherein the value is a hard coded value comprising one of a size class type, an offset to a non-static data member, and virtual function table offset.

18. The method of claim 16, wherein the table comprises a table of vtable offsets.

19. The method of claim 16, wherein the table comprises a table of class types sizes.

20. The method of claim 16, wherein the table comprises a table of subobject offsets within containing classes.

21. The method of claim 16, wherein the table is stored in a header portion of the object.

22. A system for converting software code to an object, comprising:
    a computing device that receives the software code, wherein the computing device comprises a translator that translates the software code to at least one object, the translator comprising a module to determine that the software code includes an item of interest that requires a value being coded into the at least one object, and a module to create a variable to represent the value, wherein the variable is written in the object rather than the value; and
    a table associated with the at least one object that stores the value, wherein the variable is linked to the value.

23. The system of claim 22, further comprising a linker that links the at least one object into an executable program.

24. The system of claim 23, wherein the linker consults the table of the at least one object to fill in the variable with the value.

25. The system of claim 24, wherein the value is hard coded in the executable program.

26. The system of claim 24, further comprising a loader that loads the executable program into a memory for execution of the executable program.

27. The system of claim 26, wherein the executable program comprises an executable variable table, wherein the loader consults the executable variable table to fill in any variables, that have not been filled in, with a hard coded value.

28. A non-transitory computer readable storage medium for converting software code to an object, the computer readable storage medium having computer readable program code embodied therewith, the computer readable program code comprising:

computer readable program code configured to receive the software code;

computer readable program code configured to translate the software code to an the object;

computer readable program code configured to determine that the software code includes an item of interest that requires a value being coded into the object;

computer readable program code configured to create a variable to represent the value in the object, wherein the variable is written in the object rather than the value; and computer readable program code configured to store the value represented by the variable in a table associated with the object.

\* \* \* \* \*